United States Patent [19]

Howell

[11] Patent Number: 4,937,842

[45] Date of Patent: Jun. 26, 1990

[54] SELF ADJUSTING DATA DETECTOR

[75] Inventor: William J. Howell, Chandler, Ariz.

[73] Assignee: Motorola Inc., Schaumburg, Ill.

[21] Appl. No.: 314,335

[22] Filed: Feb. 23, 1989

[51] Int. Cl.$^5$ ............................................. H04L 27/08
[52] U.S. Cl. ...................................... 375/98; 455/240; 455/245
[58] Field of Search ............... 375/75, 76, 98; 455/71, 455/232, 240, 241, 250; 358/174, 178; 307/357, 358, 359

[56] References Cited

U.S. PATENT DOCUMENTS

| | | | |
|---|---|---|---|
| 3,409,834 | 11/1968 | Cullis et al. | 375/98 |
| 3,733,553 | 5/1973 | Magnante et al. | 375/98 |
| 4,099,124 | 7/1978 | Sharpe et al. | 358/178 |
| 4,250,458 | 2/1981 | Richmond et al. | 375/76 |
| 4,339,727 | 7/1982 | Kage et al. | 375/76 |
| 4,479,253 | 10/1984 | Daniel, Jr. | 455/226 |
| 4,757,502 | 7/1988 | Meurich et al. | 375/98 |

Primary Examiner—Douglas W. Olms
Assistant Examiner—Stephen Chin
Attorney, Agent, or Firm—Michael D. Bingham

[57] ABSTRACT

A self adjusting data detector receives a modulated carrier waveform and removes the carrier signal, leaving a bandwidth limited waveform. The bandwidth limited waveform represents a digital signal which has lost its squared edges due to the high frequency components which were suppressed during modulation, transmission, and demodulation. The self adjusting data slicer uses a first peak detector to feedback a detector bias voltage to set one peak of the bandwidth limited waveform to a predetermined level. A second peak detector is used to feedback a peak bias voltage to set the opposite peak of the bandwidth limited waveform to a second predetermined level. A data slicer is then able to accurately slice the bandwidth limited waveform at a predetermined magnitude therein recovering the original timing of the digital signal. The data slicer is able to maintain its accuracy over changing modulation levels.

15 Claims, 1 Drawing Sheet

SELF ADJUSTING DATA DETECTOR

FIELD OF THE INVENTION

This invention relates in general to the field of communication circuits and, more particularly, to a self adjusting data detector for recovering and reconstructing a digital signal from a modulated carrier signal with the duty cycle of the original modulating signal intact and free from data dependent jitter.

BACKGROUND OF THE INVENTION

Many forms of signal transmission are available wherein the information signal modulates a carrier signal and the signals are then transmitted. Modulation techniques include Amplitude Modulation (AM), Frequency Modulation (FM), Phase Modulation (PM), Pulse Code Modulation (PCM), etc. In Amplitude Modulation, the carrier signal waveform's amplitude is made to vary proportionately with the modulating signal. It is often desirable to transmit digital information in this manner, for example, when communicating between computers. The squared edges of the original digital signal are often lost in the modulation, transmission, and reception process due to bandwidth limitations which remove the high frequency components which make up the digital signal. What is recovered is a waveform having peak magnitudes substantially equal to the peak magnitudes of the original digital signal but with substantially reduced rise and fall times.

After receiving and removing the carrier signal waveform, it is often necessary to not only reconstruct the digital information of ones and zeros from the modulating waveform representing the original digital signal, but it is also necessary to recover the correct timing. This is accomplished with a data slicer circuit, wherein the data slicer may provide squared edges which were lost during modulation and transmission. A common problem associated with recovering the digital signal is loss of the original duty cycle and jitter which is data dependent.

Thus, what is needed is a self adjusting data detector for recovering and reconstructing a digital signal from a modulated carrier signal with the duty cycle of the original modulating signal intact and free from data dependent jitter.

SUMMARY OF THE INVENTION

Accordingly, it is an object of the present invention to provide an improved data detector which recovers a transmitted digital signal having the original timing of the transmitted digital signal.

It is a further object of the present invention to provide a data detector which is free from data dependent jitter.

It is still a further object of the present invention to provide a data detector capable of compensating for changing modulation levels.

It is yet another object of the present invention to provide a data detector having a data slicer circuit directly coupled to the receiver circuit.

In carrying out the above and other objects of the present invention in one form, there is provided a circuit comprising an R.F. amplifier coupled for receiving a modulated carrier signal, an I.F. amplifier coupled to the R.F. amplifier, and a detector circuit coupled to the I.F. amplifier for removing the carrier signal from the modulating data signal and amplifying the data signal. A first feedback circuit is coupled to the detector circuit, and to the R.F. amplifier and to the I.F. amplifier for limiting the peak magnitude of the data signal. A second feedback circuit is coupled to the first feedback circuit and to the detector circuit for setting and maintaining a desired operating point of the detector circuit.

The above and other objects, features, and advantages of the present invention will be better understood from the following detailed description taken in conjunction with the accompanying drawings.

DETAILED DESCRIPTION OF THE INVENTION

Figure 1:
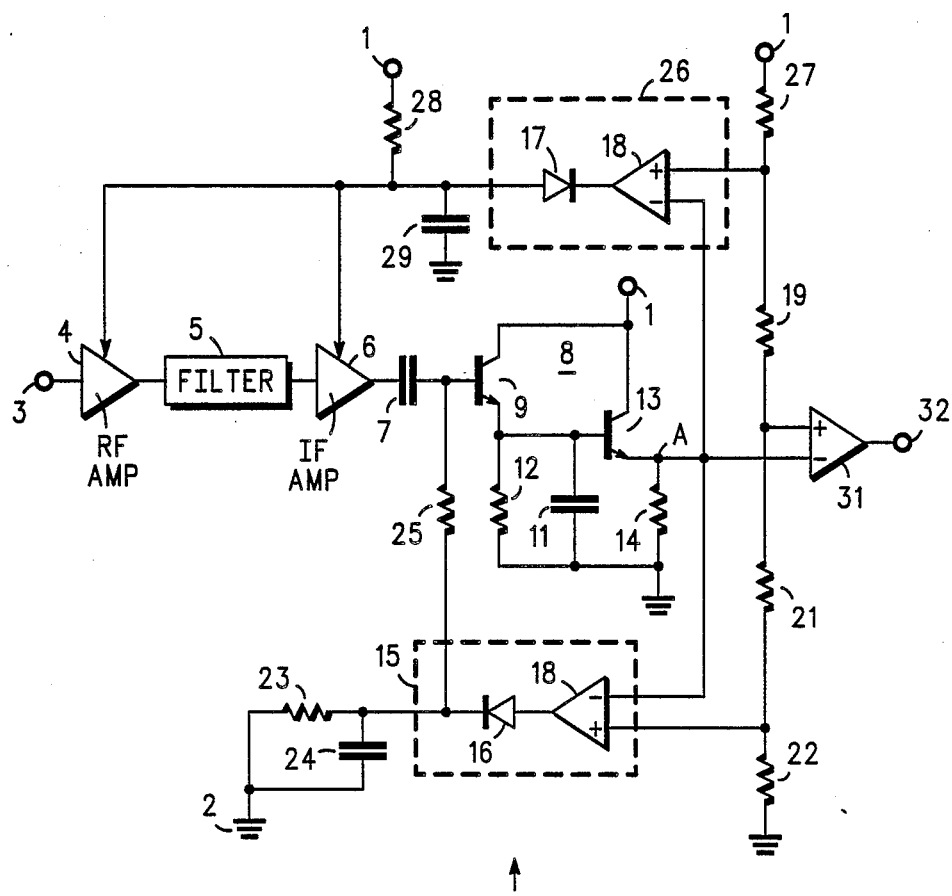
FIG. 1 is a schematic diagram of a self adjusting data detector.

FIG. 1 depicts an Amplitude Modulation (AM) receiver circuit 10 having a data slicer. An input terminal 3 receives a transmitted data signal from an antenna (not shown). Input terminal 3 is connected to the input of Radio Frequency (R.F.) amplifier 4 which provides signal selectivity to separate incoming signals and further amplifies the received signals. The output of the R.F. amplifier 4 is connected to the input of a filter 5 which provides precise bandpass filtering for Intermediate Frequency (I.F.) amplifier 6. The filter 5 has an output connected to the input of the I.F. amplifier 6. A mixer and local oscillator are typically located between the filter 5 and the I.F. amplifier 6 to reduce the frequency of the carrier signal but is not shown as it does not affect the present invention. The I.F. amplifier 6 is a fixed-tuned circuit which is a bandpass filter allowing only the wanted signal to pass to the detector circuit 8, and amplifies the signal to a level which can be used in the detector circuit 8.

In the detector circuit 8, a bipolar transistor 9, a capacitor 11, and a resistor 12 provide a diode envelope detector function. The bipolar transistor 9 has a collector connected to a supply voltage terminal 1, a base coupled to the output of the I.F. amplifier 6 by a coupling capacitor 7, and an emitter coupled to a supply voltage terminal 2 by the parallel combination of the capacitor 11 and the resistor 12. The capacitor 11 is a bypass capacitor whose reactance will be much smaller than that of the resistor 12 at midband and high frequencies. At these frequencies the detector circuit 8 will behave as a normal Common Emitter (CE) amplifier. The carrier signal at the emitter of the bipolar transistor 9 will be substantially zero since the emitter is essentially shorted to the supply voltage terminal 2 at the carrier signal frequency. At lower frequencies and D.C., (i.e., the data signal frequency) the reactance of the capacitor 11 is much larger than that of the resistor 12. This change in reactance is equivalent to negative feedback which reduces the gain of the detector circuit 8. The signal at the emitter of the bipolar transistor 9, then, is the transmitted signal minus the carrier signal or the data signal which is a bandwidth limited signal.

Figure 2:
FIG. 2 is a timing diagram of the bandwidth limited and recovered data signal.
Figure 2:
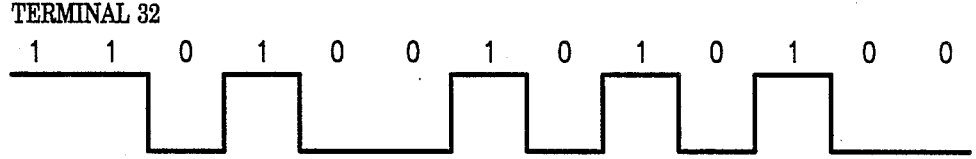

The bandwidth limited signal is amplified by a bipolar transistor 13 and a resistor 14. The bipolar transistor 13 has a collector connected to the supply voltage terminal 1, a base connected to the emitter of the bipolar transistor 9, and an emitter coupled to a node A. The node A is coupled to the supply voltage terminal 2 by the resistor 14. The amplified bandwidth limited signal at node A is shown in FIG. 2. The peak to peak amplitude of the amplified bandwidth limited signal is limited to predetermined peak magnitudes by the use of two feedback signals that control a detector bias voltage and a peak bias voltage (an automatic gain control type signal).

Two reference voltages, a detector reference voltage and a peak reference voltage, are set up by resistors 27, 19, 21, and 22. A first terminal of the resistor 27 is connected to the supply voltage terminal 1 and a second terminal is connected to a first terminal of the resistor 19. A second terminal of the resistor 19 is connected to a first terminal of the resistor 21 and a second terminal of the resistor 21 is connected to the first terminal of the resistor 22. A second terminal of the resistor 22 is connected to the supply voltage terminal 2. The detector reference voltage is established at the first terminal of the resistor 22 and the peak reference voltage is established at the second terminal of the resistor 27. The detector reference voltage is used to determine the magnitude of the detector bias voltage and the peak reference voltage is used to determine the magnitude of the peak bias voltage.

The detector bias voltage is provided by a peak detector 15 which sets the D.C. operating point for the detector circuit 8. The peak detector 15, for example, comprises a comparator 18 having a noninverting input connected to the first terminal of the resistor 22 for receiving the detector reference voltage, an inverting input connected to the node A for receiving the amplified bandwidth limited signal, and an output coupled to the anode of a diode 16. A cathode of the diode 16 is coupled to the base of the bipolar transistor 9 by a resistor 25. A resistor 23 and a capacitor 24 are connected in parallel between the cathode of the diode 16 and the supply voltage terminal 2. The resistor 23 and the capacitor 24 form a filter having a relatively long time constant for holding the peak bias voltage at the cathode of the diode 16. The peak detector 15 determines the magnitude of the detector bias voltage by comparing the magnitude of the bandwidth limited signal to the magnitude of the detector reference voltage.

A peak detector 26, which is similar to the peak detector 15, has comparator 34 having an inverting input connected to the node A, a noninverting input connected to the second terminal of the resistor 27, and an output connected to a cathode of a diode 17. An anode of the diode 17 is connected to both the R.F. amplifier 4 and the I.F. amplifier 6. A resistor 28 is coupled between the supply voltage terminal 1 and the anode of the diode 17, and a capacitor 29 is coupled between the anode of the diode 17 and the supply voltage terminal 2. The output of the peak detector 26 is the peak bias voltage which acts to decrease the gain of both the R.F. amplifier 4 and the I.F. amplifier 6 if the peak magnitude of the bandwidth limited waveform exceeds a predetermined maximum as determined by the peak reference voltage.

A data slicer 31 provides an output waveform with edges having much faster rise and fall times. The data slicer 31 has a noninverting input connected to the second terminal of the resistor 19, an inverting input connected to the node A, and an output connected to an output terminal 32. If the resistance of the resistor 19 is set equal to the resistance of the resistor 21, the data slicer output waveform will reconstruct the original duty cycle with the slicing occurring in the center of the amplified bandwidth limited signal as shown in FIG. 2. The Resistors 27, 19, 21, and 22 may be adjusted to vary the point where the slicing occurs. The data slicer 31 is directly connected to the detector circuit 8. Typically data slicers are a.c. coupled (by a coupling capacitor) to the detector stage which is the cause of data dependent jitter since the coupling capacitor tends to hold a small charge (due to relatively long periods on nonchanging data) which then changes the slicing point.

The result of the peak detector 15 is to clamp a negative peak (minimum carrier voltage) at a reference based on the detector reference voltage and biases the detector 8 accordingly. The peak detector 26 adjusts the opposite peak (the positive peaks) to a reference level based on the peak reference voltage. The data slicer 31 can then accurately reconstruct the bandwidth limited signal between the two peak levels based on the resistance values of the resistors 27, 19, 21 and 22.

It should be appreciated that although the preferred embodiment shows a self adjusting data slicer system as applied to an AM detector circuit, one skilled in the art could apply the same concept to other demodulation circuits, for example, an FM detector.

By now it should be appreciated that there has been provided a self adjusting data detector for receiving and recovering a digital signal from a transmitted modulated carrier signal with the duty cycle of the original modulating signal intact and free from data dependent jitter.

I claim:

1. A data slicer circuit comprising:
   a first supply voltage terminal for receiving a first voltage;
   a second supply voltage terminal for receiving a second supply voltage;
   an input terminal coupled for receiving a modulated carrier signal;
   an output terminal for providing a recovered digital signal;
   a Radio Frequency amplifier having an input coupled to said input terminal, and having an output;
   an Intermediate Frequency amplifier having an input coupled to the output of said Radio Frequency amplifier, and having an output;
   a first transistor having a base coupled to the output of said Intermediate Frequency amplifier, a collector coupled to said first supply voltage terminal, and having an emitter;
   a first capacitor coupled between the emitter of said first transistor and said second supply voltage terminal;
   a first resistor coupled in parallel with said first capacitor;
   a first amplifier having an input coupled to the emitter of said first transistor and having an output;
   a first peak detector having a first input coupled to the output of said first amplifier, a second input coupled for receiving a detector reference voltage, and an output coupled to the base of said first transistor;
   a second peak detector having a first input coupled to a peak reference voltage, a second input coupled to the output of said first amplifier, and having an output coupled to said Radio Frequency and said Intermediate Frequency amplifier for controlling the gain of said Radio Frequency amplifier and said Intermediate Frequency amplifier; and a second amplifier having a first input connected to the output of said first amplifier, a second input coupled for receiving a voltage which is derived from both the detector bias voltage and the peak reference voltage, and an output coupled to said output terminal.

2. A circuit comprising:

a Radio Frequency amplifier coupled for receiving a modulated input signal;

an Intermediate Frequency amplifier coupled to said Radio Frequency amplifier;

detector means having an input coupled to said Intermediate Frequency amplifier for demodulating said input signal;

means for developing a plurality of reference potentials of unequal magnitudes; and feedback means for setting and maintaining a desired operating point of said detector means wherein said feedback means includes, (a) a first comparator having a first input at which a first reference potential of said plurality of reference potentials is applied and a second input for receiving said demodulated input signal and having an output coupled to said input of said detector means, (b) a first diode having an anode coupled to said output of said first comparator and having a cathode, (c) a first resistor coupled between said cathode of said first diode and said input of said detector means, (d) a second resistor coupled between said cathode of said first diode and a first source of operating potential, and (e) a first capacitor coupled between in parallel with said second resistor.

3. The circuit according to claim 2 further comprising a peak detector responsive to a predetermined threshold of said demodulated input signal and a second reference potential of said plurality of reference potentials for controlling the gains of said Radio Frequency amplifier and said Intermediate Frequency amplifier to limit the peak magnitude of said input signal.

4. The circuit according to claim 3 wherein said feedback means compensates said input signal so as to maintain a predetermined minimum level of said demodulated input signal.

5. The circuit according to claim 4 further comprising:

an operational amplifier having a first input coupled for receiving said demodulated input signal and a second input at which a third reference potential of said plurality of reference potentials is applied for providing a digital output signal having reduced data dependent jitter; and second capacitor coupled between said Intermediate Frequency amplifier and said input of said detector means for blocking low frequency components of said input signal.

6. The circuit according to claim 5 wherein said peak detector includes:

a second comparator having a first input at which said second reference potential is applied and a second input coupled for receiving said demodulated input signal and having an output; and a second diode having a cathode coupled to said output of said second comparator and an anode coupled to said Intermediate Frequency amplifier and to said Radio Frequency amplifier.

7. The circuit according to claim 6 wherein said peak detector further includes:

a third resistor coupled between said anode of said second diode and a second source of operating potential; and a third capacitor coupled between said anode of said second diode and said first source of operating potential.

8. The circuit according to claim 7 wherein said peak detector compensates said input signal for varying levels of modulation so as to maintain a predetermined maximum level of said demodulated input signal.

9. A self adjusting data slicer circuit for recovering the digital information from an analog signal wherein the edges of the recovered digital signal correspond to a predetermined magnitude of the analog signal, said data slicer comprising:

a Radio Frequency an amplifier coupled for receiving a modulated input signal;

an Intermediate Frequency amplifier coupled to said Radio Frequency amplifier;

detector means coupled to said Intermediate Frequency amplifier for demodulating said input signal and providing the analog signal;

means for developing a plurality of reference potentials of unequal magnitudes;

feedback means for setting and maintaining a desired operating point of said detector means wherein said feedback means includes, (a) a first comparator having a first input at which a first reference potential of said plurality of reference potentials is applied and a second input for receiving said demodulated input signal and having an output coupled to said input of said detector means, (b) a first diode having an anode coupled to said output of said first comparator and having a cathode, (c) a first resistor coupled between said cathode of said first diode and said input of said detector means, (d) a second resistor coupled between said cathode of said first diode and a first source of operating potential, and (e) a first capacitor coupled between in parallel with said second resistor; and amplifier means responsive to the analog signal and to a second reference potential of said plurality of reference potentials for providing the digital signal with reduced data dependent jitter.

10. The data slicer circuit according to claim 9 further comprising a peak detector responsive to a predetermined threshold of said demodulated input signal and a third reference potential of said plurality of reference potentials for controlling the gains of said Intermediate Frequency amplifier and said Radio Frequency amplifier to limit the peak magnitude of said input signal.

11. The data slicer circuit according to claim 10 wherein said feedback means compensates said input signal so as to maintain a predetermined minimum level of the analog signal.

12. The data slicer circuit according to claim 11 further comprising a second capacitor having a first terminal coupled to said Intermediate Frequency amplifier and a second terminal coupled to said input of said detector means for blocking low frequency components of said input signal.

13. The data slicer circuit according to claim 12 wherein said detector means comprises:
    a first transistor having a collector coupled to a second source of operating potential, a base coupled to said second terminal of said second capacitor, and having an emitter;
    a third capacitor coupled between said emitter of said first transistor and said first source of operating potential;
    a second resistor coupled in parallel with said third capacitor;
    a second transistor having a collector coupled to said second source of operating potential, a base coupled to said emitter of said first transistor, and having an emitter; and
    a fourth resistor coupled between said emitter of said second transistor and said first source of operating potential.

14. The data slicer circuit according to claim 13 wherein said peak detector comprises:
    a second comparator having a first input coupled to said emitter of said second transistor and a second input at which said third reference potential is applied and having an output; and
    a second diode having a cathode coupled to said output of said second comparator, and having an anode coupled to said Radio Frequency amplifier and to said Intermediate Frequency amplifier.

15. The circuit according to claim 14 wherein said peak detector further includes:
    a fifth resistor coupled between said anode of said second diode and said second source of operating potential; and
    a fourth capacitor coupled between said anode of said second diode and said first source of operating potential.

* * * * *